United States Patent
Schran et al.

(10) Patent No.: US 7,502,797 B2
(45) Date of Patent: Mar. 10, 2009

(54) SUPERVISING MONITORING AND CONTROLLING ACTIVITIES PERFORMED ON A CLIENT DEVICE

(75) Inventors: Adam Schran, Philadelphia, PA (US); Michael J. Neil, Philadelphia, PA (US)

(73) Assignee: Ascentive, LLC, Philadelphia, PA (US)

( * ) Notice: Subject to any disclaimer, the term of this patent is extended or adjusted under 35 U.S.C. 154(b) by 0 days.

(21) Appl. No.: 10/966,017

(22) Filed: Oct. 15, 2004

(65) Prior Publication Data

US 2005/0086255 A1 Apr. 21, 2005

Related U.S. Application Data

(60) Provisional application No. 60/511,213, filed on Oct. 15, 2003.

(51) Int. Cl.
*G06F 17/30* (2006.01)

(52) U.S. Cl. .............................. 707/10; 707/9; 709/224

(58) Field of Classification Search ................ 709/224, 709/203, 225; 707/9, 10, 103 R, 103 X, 103 Y, 707/103 Z, 200, 202, 204, 102; 340/825; 725/25, 28; 702/188, 187; 705/51, 56
See application file for complete search history.

(56) References Cited

U.S. PATENT DOCUMENTS

| | | | |
|---|---|---|---|
| 5,832,212 A | | 11/1998 | Cragun et al. |
| 6,026,440 A | * | 2/2000 | Shrader et al. ............... 709/224 |
| 6,070,190 A | * | 5/2000 | Reps et al. ................... 709/224 |
| 6,356,859 B1 | * | 3/2002 | Talbot et al. ................. 702/188 |
| 6,363,391 B1 | * | 3/2002 | Rosensteel, Jr. .............. 707/102 |
| 6,366,298 B1 | | 4/2002 | Haitsuka et al. |
| 6,446,119 B1 | * | 9/2002 | Olah et al. ................... 709/224 |
| 6,691,067 B1 | * | 2/2004 | Ding et al. ................... 702/186 |
| 6,697,810 B2 | * | 2/2004 | Kumar et al. ................. 707/10 |
| 6,721,688 B1 | * | 4/2004 | Clarke ......................... 702/188 |
| 6,795,856 B1 | * | 9/2004 | Bunch ......................... 709/224 |
| 6,839,708 B1 | * | 1/2005 | Boydstun et al. .............. 707/10 |
| 6,895,437 B1 | * | 5/2005 | Cowdrey et al. ............. 709/224 |
| 7,069,316 B1 | * | 6/2006 | Gryaznov .................... 709/224 |

(Continued)

OTHER PUBLICATIONS

Web Site, www.spector.com, Spector Pro 5.0 product, pp. 1-3, print shot taken on Oct. 15, 2004.

*Primary Examiner*—Greta L Robinson
(74) *Attorney, Agent, or Firm*—Robert R. Axenfeld; Montgomery, McCracken, Walker & Rhoads, LLP

(57) ABSTRACT

A client monitoring application operating on a client device records and monitors human activity performed thereon. The client monitoring application forwards recorded activity to supervisor server(s) over a network. The supervisor server(s) enable a human supervisor to review human activity performed on the client device, issue alerts to the human when a particular activity is performed on the client device, and/or instruct the client monitoring application to intercept and block certain activities or classes of activities from taking place on the client device at any time or at designated times, or limited to designated durations. Recording and monitoring human activity performed on the client device includes capturing screen shots of real-time human activity performed on the client device, enabling viewing a screen shots even if data associated with the screen shots are transmitted, received, or saved in an encrypted format, which is particularly useful in the realm of counter terrorism, and child protection.

7 Claims, 9 Drawing Sheets

U.S. PATENT DOCUMENTS

| | | | |
|---|---|---|---|
| 2001/0037385 A1* | 11/2001 | Kim | 709/224 |
| 2002/0026507 A1 | 2/2002 | Sears et al. | |
| 2002/0111887 A1* | 8/2002 | McFarlane et al. | 705/30 |
| 2002/0174241 A1* | 11/2002 | Beged-Dov et al. | 709/230 |
| 2003/0037138 A1* | 2/2003 | Brown et al. | 709/225 |
| 2003/0182420 A1* | 9/2003 | Jones et al. | 709/224 |
| 2004/0111507 A1* | 6/2004 | Villado et al. | 709/224 |
| 2004/0158630 A1* | 8/2004 | Chang et al. | 709/224 |
| 2004/0158631 A1* | 8/2004 | Chang et al. | 709/224 |

* cited by examiner

SUPERVISING MONITORING AND CONTROLLING ACTIVITIES PERFORMED ON A CLIENT DEVICE

CROSS-REFERENCE TO RELATED APPLICATIONS

The present patent application claims benefit of U.S. Provisional Application Ser. No. 60/511,213 filed on Oct. 15, 2003. The content of the aforementioned application is fully incorporated by reference herein.

TECHNICAL FIELD

This invention relates to supervising, monitoring, and controlling user activities performed on a computer device.

BACKGROUND

People often have a desire to supervise user activity (i.e., activities performed by a human) taking place on a particular computer. For instance, in a household environment, parents want to make sure their children are not exposed to potentially dangerous situations on the Internet, especially when they are not present to closely supervise their children. Specifically, parents often want to protect their children from unintentionally interacting with child molesters, viewing internet pornography, speaking to strangers, mentioning using drugs, visiting hate group web sites, gambling on-line and so forth. Unfortunately, filters and other preventive measures on the market today are often bypassed by computer savvy children, or are ineffective and deficient, leaving children vulnerable.

In an organizational environment, employers often have an inadequate understanding of what employees are doing on their computers, for example what sites they are visiting, how much time they are spending on particular sites, whether they are spending time on non-work related activities, such as games and internet surfing. In addition, current filters and preventive measures are circumvented by employees through the use of non-standard e-mail to avoid employer detection. For instance, some employees may use free mail sites or instant messaging sites that leave no permanent record of the content of their messages or activities on the employer's computer systems.

In a domestic relationship environment, a spouse or friend of an individual may suspect that the individual is cheating, using drugs, or engaging in some other types of negative behavior, and the individual may use a computer to perpetrate the suspected behavior. However, the individual may be using free mail sites, chat rooms, or instant messaging on the computer, making it difficult for their spouse or friend to assess the situation discreetly.

In law enforcement and counter terrorism environments, it is often very difficult to monitor communication taking place between suspected terrorists on a particular computer, even if law enforcement is able to eavesdrop on communications to and from the particular computer. Terrorists often use encryption software to encrypt their data, making it extremely difficult for government agencies to quickly comprehend the nature of the terrorists' communications while in transit.

These are just a few examples of the various problems associated with supervising, monitoring, and controlling the computer activity of a user today.

SUMMARY

Supervising, monitoring, and controlling user computer activity is described herein. A client monitoring application operating on a client device records and monitors user activity performed thereon. The client monitoring application typically operates as a background application and may operate in a stealth mode, without alerting the user. The client monitoring application forwards recorded activity (real-time activity or stored activity) to one or more supervisor servers over a network, such as a Local Area Network or the Internet. Human supervisors are then able to login to the supervisor servers and review the activity performed on the client device.

In one innovative implementation, a human supervisor is able to review the activity performed on the client device, including, but not limited to, identifying the activities performed, applications used, and data associated therewith, such as Internet activity, electronic mail messages, instant messages, chat sessions, key words, keystrokes, screen shots, applications, the date and time particular activities were performed or applications were used, and the duration of any activity performed or application used. The human supervisor can supervise and monitor the client device remotely over a network.

In another innovative implementation, the human supervisor is able to request notification when a particular activity is performed on the client device. For instance, the human supervisor can request that an alert message be sent to the human supervisor if certain subjects, such as, but not limited to, sex, drugs, violence, infidelity, hate language, and other subjects designated by the human supervisor are performed (e.g., viewed, created, transmitted, or received) on the client device. The alert message may be generated in accordance with when an activity is performed, when a certain duration of an activity performed is reached, or other parameters designated by the human supervisor.

The alert message may be sent from the one or more supervisor servers to an alerting device. For instance, the alert message may be sent to: a computer such as another client device, a cell phone, a beeper, a land-line phone, a portable digital assistant, a handheld device, a television set-top box, and so forth. The alert message may be sent in various formats including, but not limited to, an electronic mail message, a text message, and/or an audio message. The alert message may also summarize the particular user activity performed by the user on the client device, and include other information, such as the duration of, or time and date the particular user activity that was performed.

In another innovative implementation, the human supervisor is able to subscribe to a service whereby particular real-time activity performed on the client device is automatically restricted when it falls with certain designated parameters. For instance, the human supervisor can instruct the client device to intercept and block the initiation of certain activities to prevent them from taking place on the client device. Activities can be blocked: (i) based on the class of activity attempted, (ii) based on the duration of, or time and/or date the particular user activity that was performed, or (iii) based on a particular activity and/or keystroke. Additionally, once the activity is attempted, an alert message may be sent to the human supervisor.

In another innovative implementation, monitoring and recording of user activity performed on the computer includes capturing screen shots of real-time user activity performed on the client device. These captured screen shots include screen shots generated by applications or devices that transmit and receive information in an encrypted format. In the realm of counter terrorism and government investigations, this enables the human supervisor, such as a law enforcement official, to view the content of messages or activity in an unencrypted format, regardless of whether the message or activity is transmitted or received in an encrypted format.

These and other implementations will be described below when read in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Exemplary Environment

Figure 1:
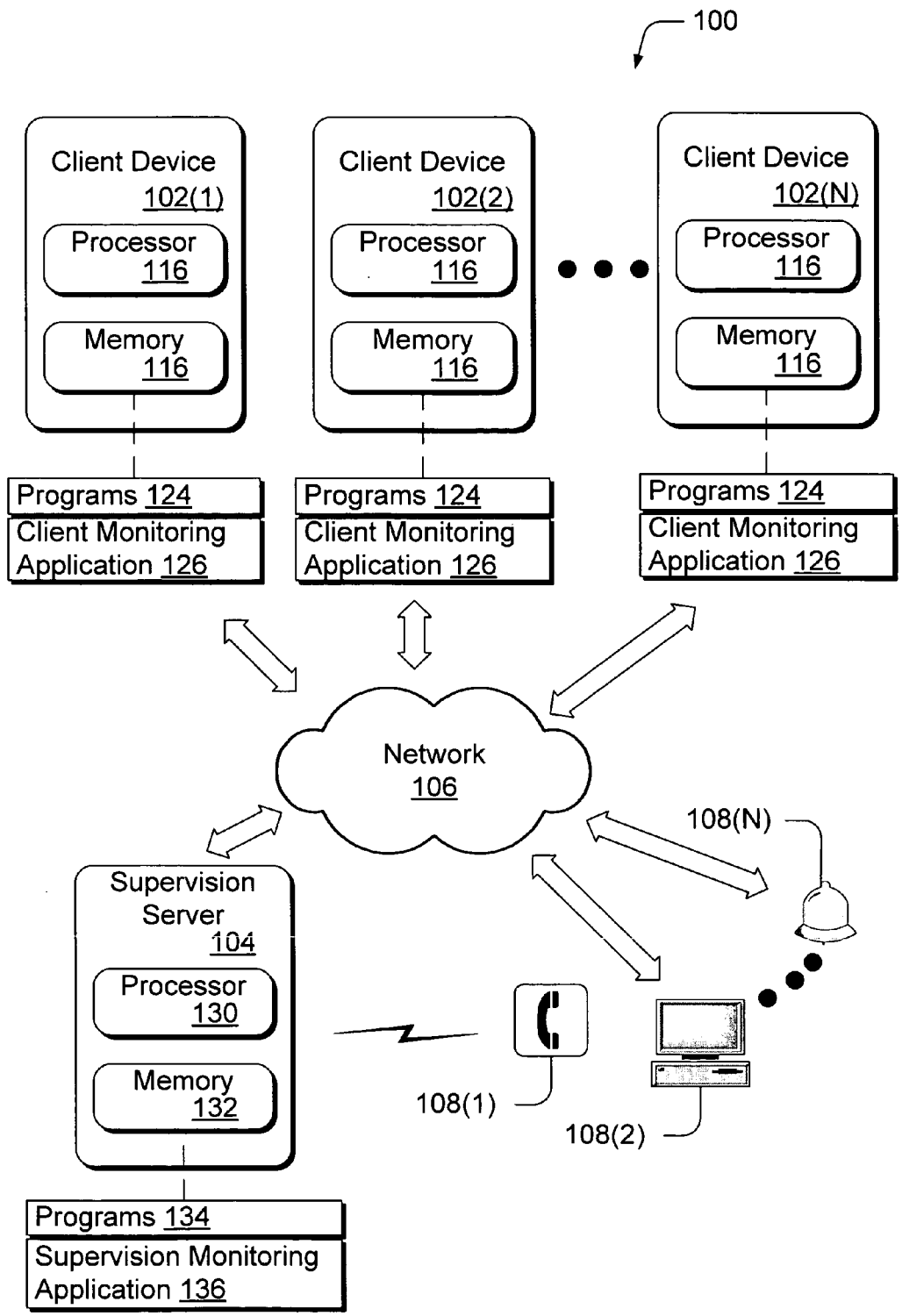
FIG. 1 illustrates an exemplary computing environment in which supervising, monitoring, and controlling user activity on a computer device may be implemented.

FIG. 1 illustrates an exemplary computing environment 100 in which supervising, monitoring, and controlling user activity on a computer device may be implemented. The innovative systems and methods described herein are operational with numerous other general purpose or special purpose computing system environments or configurations. The exemplary computing environment is only one example of a suitable computing environment and is not intended to suggest any limitation as to the scope of use or functionality of systems and methods described herein. Additionally, the exemplary computing environment should not be interpreted as having any dependency or requirement relating to any one or combination of components illustrated in the computing environment.

Examples of well known computing systems and/or component configurations that may be suitable for use in the exemplary computing environment 100 include, but are not limited to, Personal Computers (PCs) hand-held devices, multiprocessor systems, microprocessor based or programmable consumer electronics, network PCs, minicomputers, servers, mainframe computers, portable communication devices, and the like.

For example, according to one exemplary implementation, environment 100 includes one or more client devices 102(1), 102(1), . . . ,102(N) coupled to a supervision server 104 via a network 106. Also, connected to server 104 are one or more alerting devices 108(1), 108(2), . . . , 108(N). Each shall now be described in more detail.

Network 106 represents any of a variety of networks and may include the Internet, or one or more other networks (e.g., a local area network (LAN) or wide area network (WAN). Additionally, it may also be possible for various devices to communicate directly with other devices without using network 106 as a communication link in the form of a point-to-point connection.

Client devices 102 can be any of variety of computer devices, including desktop PCs, workstations, notebook or laptop computers, hand held or portable PCs, personal digital assistants (PDAs), cellular phones, Internet appliances, gaming consoles, portable communication devices, tablet PCs, televisions/set-top boxes, wireless devices, multiprocessor systems, microprocessor systems, programmable consumer electronics, multimedia systems, a combination of any of the above example devices, and other smart devices.

Each client device 102 includes at least one processor 120 and memory 122. Memory 122 may include volatile memory (e.g., RAM) and/or non-volatile memory (e.g., ROM, PCM-CIA cards, etc.). In some implementations, memory 122 is used as part of a computer's cache, permitting application data to be accessed quickly without having to permanently store data in a non-volatile memory device.

Resident in the memory 122 are one or more operating systems (not shown), and programs 124 that execute on the one or more processors 120. For purposes of illustration, programs and other executable program modules are illustrated herein as discrete blocks, although it is recognized that such programs and components reside at various times in different storage components of the client device 102, and are executed by the one or more processors 120 of the client device 102. Example of programs include, but are not limited to, application programs, email programs, word processing programs, spreadsheets programs, Internet browser programs, Web services and so forth.

As shall be described in more detail, an innovative client monitoring application 126 also resides in memory 122. The client monitoring application 126 is a program that monitors user activity performed on the client device 102, forwards recorded activity (real-time activity or stored activity) to the supervisor server 104 over network 106, and is able to intercept and block the initiation of certain activities from taking place on the client device 102.

Other elements such as power supplies, keyboards, touch pads, I/O interfaces, displays, LEDs, audio generators, vibrating devices, and so forth are not shown as being a part of client device 102, but could easily be a part of the exemplary client device 102. Additionally, although not shown, a system bus or point-to-point connections typically connects the various components within client device 102.

Supervision server 104 is a computer system capable of communicating with client devices 102. Supervision server 104 may refer to, but is not limited to, a server, a computer, a router, a mainframe computer, an enterprise server, and potentially other devices that communicate with and provide services to client devices. Additionally, server 104 may also communicate with alerting devices 108. Although only one supervision server is shown in FIG. 1, it is readily appreciated that environment 100 may include more than one supervision server 104.

Supervision server 104, also includes at least one processor 130 and memory 132. Resident in the memory 132 are one or more operating systems (not shown), and programs 134 that execute on the one or more processor 130. Other elements such as power supplies, keyboards, touch pads, I/O interfaces, displays, LEDs, audio generators, vibrating devices, and so forth are not shown in supervision server 104, but could easily be a part of the exemplary supervision server 104. Additionally, although not shown, a system bus or point-to-point connections typically connects the various components within supervision server 104.

As shall be described in more detail, an innovative supervision monitoring application 136 also resides in memory 132. The supervision monitoring application 136 is a program that communicates with a client device 102, and uploads information forwarded by the client monitoring application 124. Accordingly, the supervision monitoring application 136 enables a human supervisor to login into the supervisor server 104 and review user activity (real-time and stored) recorded on the client device 102. The supervision monitoring application 136 also enables a human supervisor to request notification in a variety of circumstances if a particular user activity is performed on the client device 102. The supervision monitoring application is also able to instruct the client monitoring application 124 to intercept and block the initiation of certain activities from taking place on the client device 102.

Accordingly, client devices 102 and supervision server 104 are designed to either run or interface with one or more programmable software applications, such as client monitoring application 126 and supervision monitoring application 136, that are programmable application components, that are reusable, and that interact programmatically over network 106 or through other communication links, typically through standard Web protocols, such as extensible markup language (XML), hypertext transport protocol (HTTP), and simple mail transfer protocol (SMTP). However, other means of interacting with over network 106 may be used, such as simple object access protocol (SOAP), remote procedure call (RPC) or object broker type technology.

In the exemplary implementation, alerting devices 108 are communication devices that can be used by a human supervisor to monitor user activity on a client device 102 and/or to receive alert messages if certain activity is detected on the client device. An alerting device 108 includes, but is not limited to a client device 102, a telephone, a beeper, a printer, a television, a display device, and other related devices. The alerting device 108 may be connected to server 104 via the network 106 or through other communication links 110, such as wired and wireless links. Alternatively, the alerting device 108 may be connected directly to a client device 102 via a network 106 or communication link 110, and receive alert messages directly from the client device 102 being monitored.

Having introduced an exemplary environment 100, it is now possible to describe the innovative client monitoring application 126 and supervision monitoring application 136 in more detail.

Exemplary Supervision Server (Supervision Monitoring Application)

Figure 2:
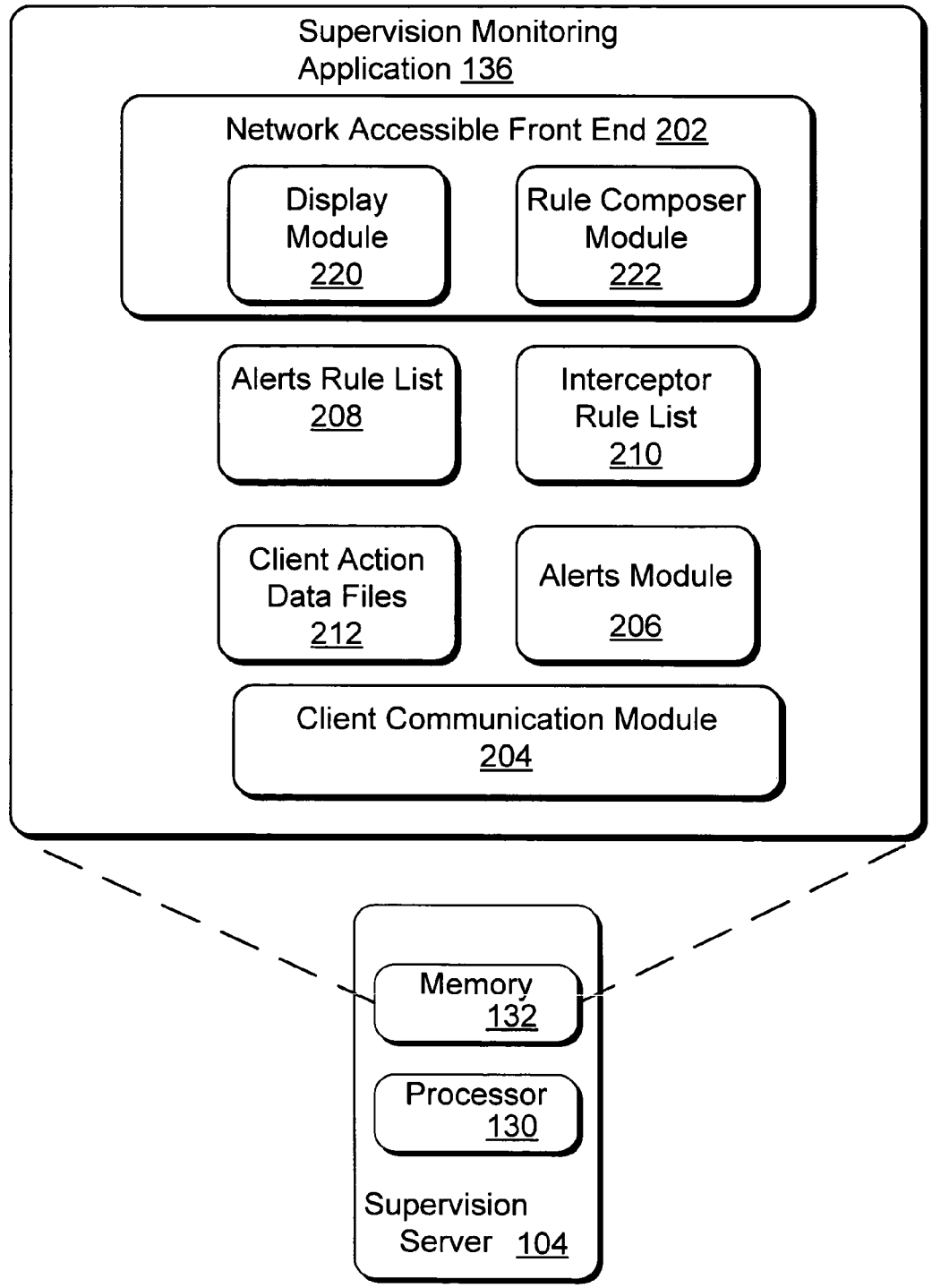
FIG. 2 is a block diagram of a supervision monitoring application residing in memory of a supervision server.

FIG. 2 is a block diagram of a supervision monitoring application 136 residing in memory 132 of supervision server 104. In this example, supervision monitoring application 136 comprises program modules and program data. Program modules typically include routines, programs, objects, components, and so on, for performing particular tasks or implementing particular abstract data types. The processor 130 is configured to fetch and execute computer program instructions from the program modules in memory 132, and is further configured to fetch data from program data while executing the supervision monitoring application 136.

In the exemplary implementation, supervision monitoring application 136 comprises a network accessible front end 202, a client communication module 204, an alerts module 206, an alerts rule list 208, an intercept rule list 210, and a client action data files 212.

Network accessible front end 202 is a module that allows a human supervisor to connect (i.e., login) into the supervision server 104 over a local or remote network 106 and access a user interface (to be described below). Using the user interface, the human supervisor can control and monitor the user's activity on the client device 102. For example, network accessible front end 202 comprises a display module 220 and a rule composer module 222.

Display module 220 enables the human supervisor to review and monitor various activities which have taken place on the client device 102. For example, the display module 220 transmits a user interface for display by the human supervisor on a computer device over network 106.

Rule composer module 222 enables a human supervisor to configure and deploy rules for alerts and intercepts.

Figure 3:
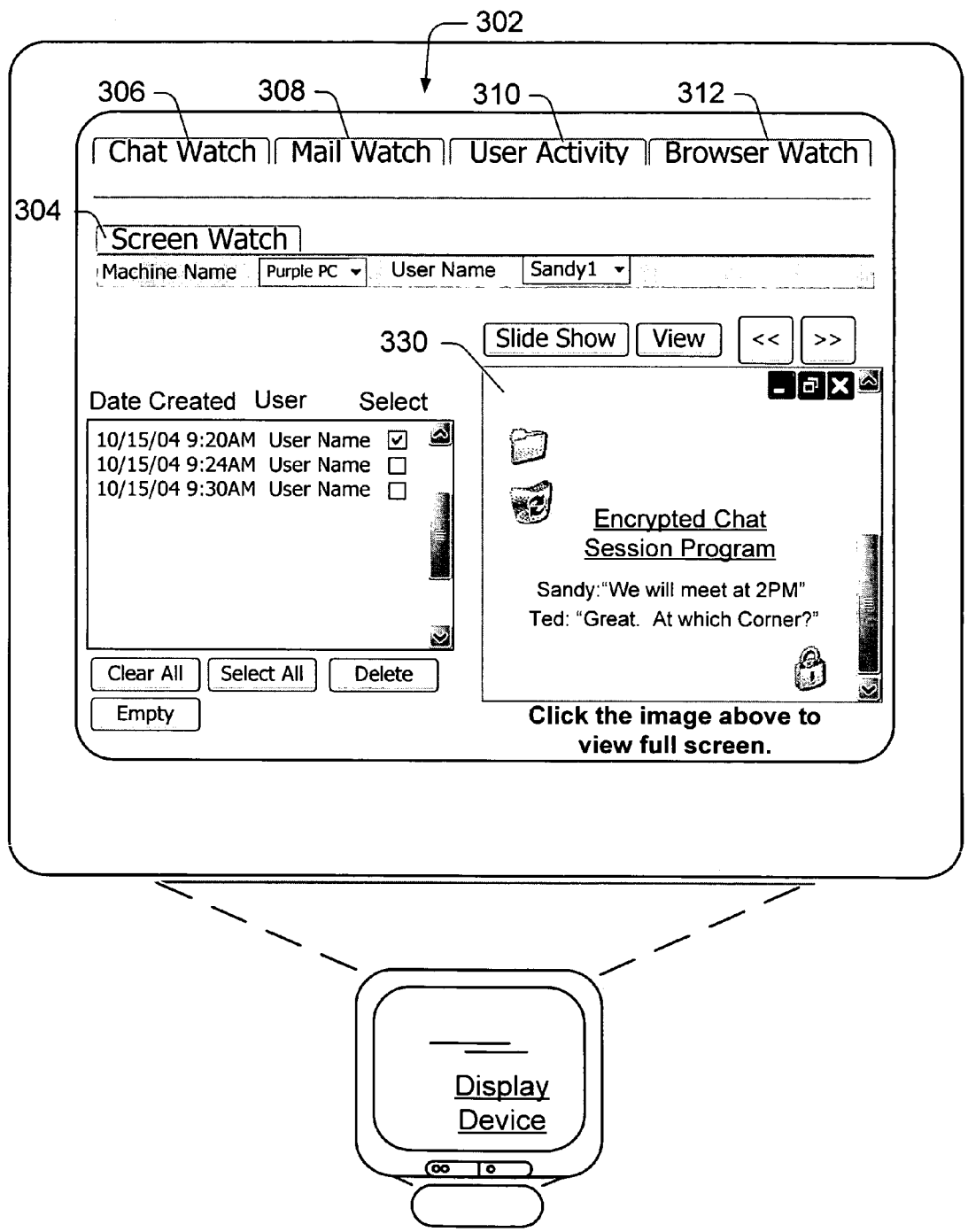
FIG. 3 illustrates an example of a user interface displayed for the human supervisor by a display module.

FIG. 3 illustrates an example of a user interface 302 displayed for the human supervisor by display module 220. Referring to FIG. 3, user interface 302 enables the human supervisor to click on various icons and view end user activity based on different parameters, such as the types of activities. For example, in one implementation, user interface 302 includes a screen watch icon 304, a chat watch icon 306, a mail watch icon 308, a user activity icon 310, and a browser watch icon 312.

If the human supervisor selects screen watch icon 304, user interface 302 will display recent snap shots of real-time activity taking place on the client device in intervals, such as at evenly spaced durations or based on each new activity launched, depending on the supervisor's preference. These snap shots are screen captures that may be displayed as a slide show, such as in window 330. Accordingly, the human supervisor can view recently saved, accessed, or modified files pertinent to supervision, view a list of recently launched applications, view system activity, such as recent keystrokes and processor usage.

If the human supervisor selects the chat watch icon 306, user interface 302 will display recent network chat sessions including the content of anything displayed by the user of the client device, in window 330.

If the human supervisor selects the mail watch icon 308, user interface 302 will display a list of recently received, or sent e-mail messages that the human supervisor can click on to display their actual contents in window 330.

It is noted that monitoring and recording of user activity performed on the computer includes capturing screen shots of real-time user activity performed on the client device. These captured screen shots include screen shots generated by applications or devices that transmit and receive information in an encrypted format. In the realm of counter terrorism and government investigations, this enables the human supervisor, such as a law enforcement official, to view the content of messages or activity in an unencrypted format, such as in window 330, regardless of whether the message or activity is transmitted or received in an encrypted format.

If the human supervisor selects the user activity icon 310, user interface 302 will display a list of all activities performed on the client device, typically in the order in which they were performed. User interface 302 will list the program name, program path, machine name, duration for which the application was used, and time and date the program was launched.

If the human supervisor selects the browser watch icon 312, user interface 302 will display a list of visited web sites visited, such as by their URL address, and the date and time the web sites were visited.

Any of the one or more of the icons on user interface 302 may appear on other display screens/pages presented on display device. Accordingly, some or all of the icons may be displayed in different screens, in different formats, in different order, with different verbiage, etc. and user interface 302 is only illustrated as one exemplary implementation.

Figure 4:
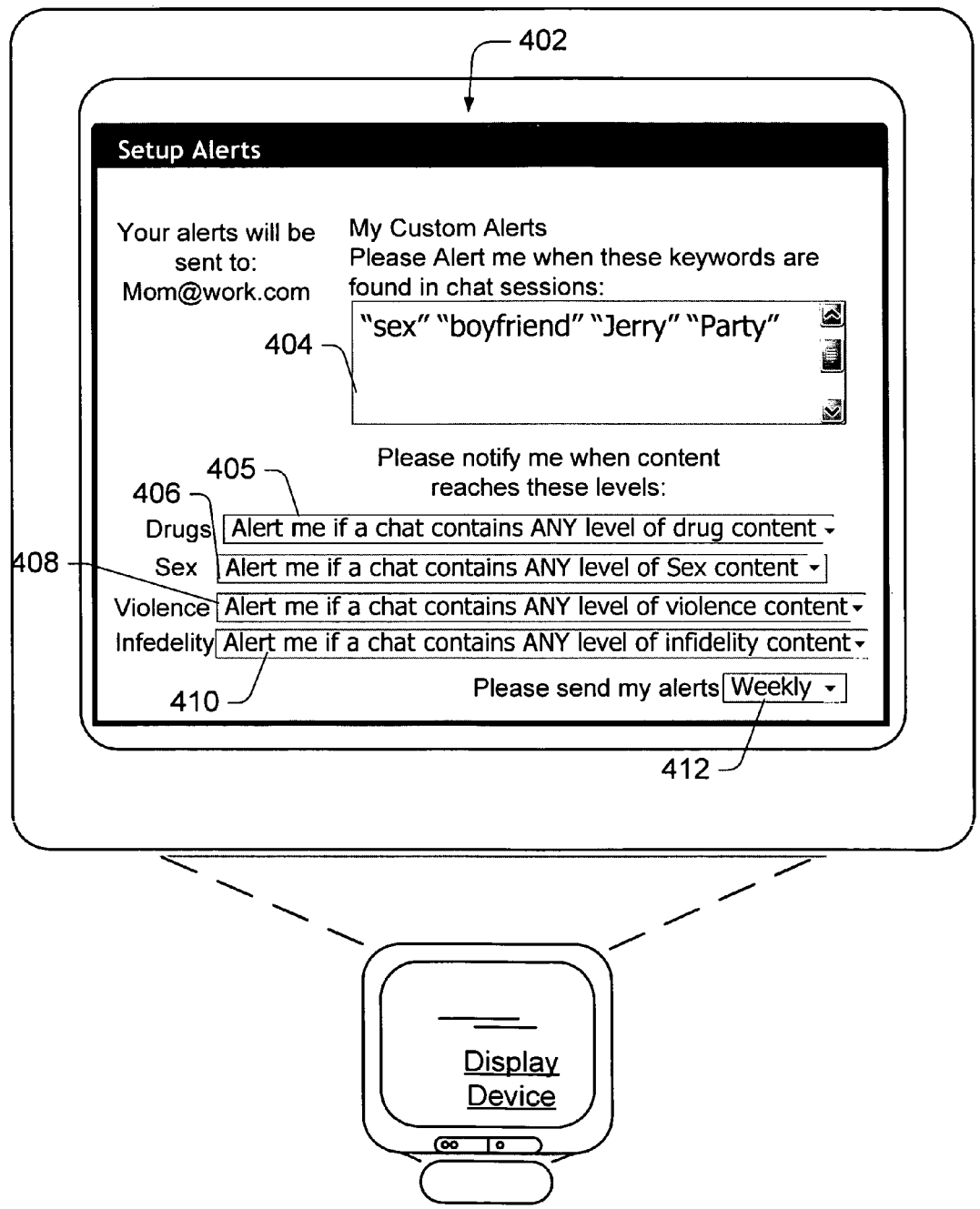
FIG. 4 illustrates an example of a user interface associated with setting-up alerts, which is displayed for the human supervisor by a rule composer module.

FIG. 4 illustrates an example of a user interface 402 displayed for the human supervisor by rule composer module 222. Referring to FIG. 4, user interface 402 enables the human supervisor to configure and deploy rules for alerts. For example, in one implementation, user interface 402 includes a custom window 404 in which the human supervisor can enter keywords or key strokes that the human supervisor desires to be alerted by some type of an alert message (such an e-mail, a page, a phone call, a text message, etc.) if they are used during chat sessions or in other communication venues such as e-mail. The contents may be completely customized and any subject designated by the human supervisor may be set for alert. For example, keystrokes may include chat colloquialisms such as "cul8r" to "see you later" or from Spanish to English, etc.).

The human supervisor can also select to be notified when a particular activity is performed on the client device by setting pull-down boxes: drug-related content box 405, sex-related content box 406, violence-related content box 408, and infidelity-related content box 410. By setting these boxes, the human supervisor can request that an alert message be sent to the human supervisor, if a topic or subject matter concerning sex, drugs, violence, infidelity, and/or hate language, are performed (e.g., viewed, created, transmitted, or received) on the client device.

Further the human supervisor can request via control icon 412 that alerts be generated when an activity is performed, daily, weekly and so forth. Alerts can also be sent at different intervals. Additionally, the human supervisor using an icon 414 can also request an alert be generated when a certain duration of an activity performed is reached on the client device, or other customized parameters designated by the human supervisor.

When the alerts are sent to the human supervisor, they may include a message identifying the activity performed on the client device, and other information, such as the date and time of the occurrence, user identity, content, and other information that the human supervisor may desire to view.

User interface 402 includes an alert designation preference window 450 in which the human supervisor can designate the alert message be sent via a particular communication method, such as Instant Messaging, pager, mobile phone text message, e-mail, a phone call, a phone cal via Interactive Voice Response (IVR), etc.

Figure 5:
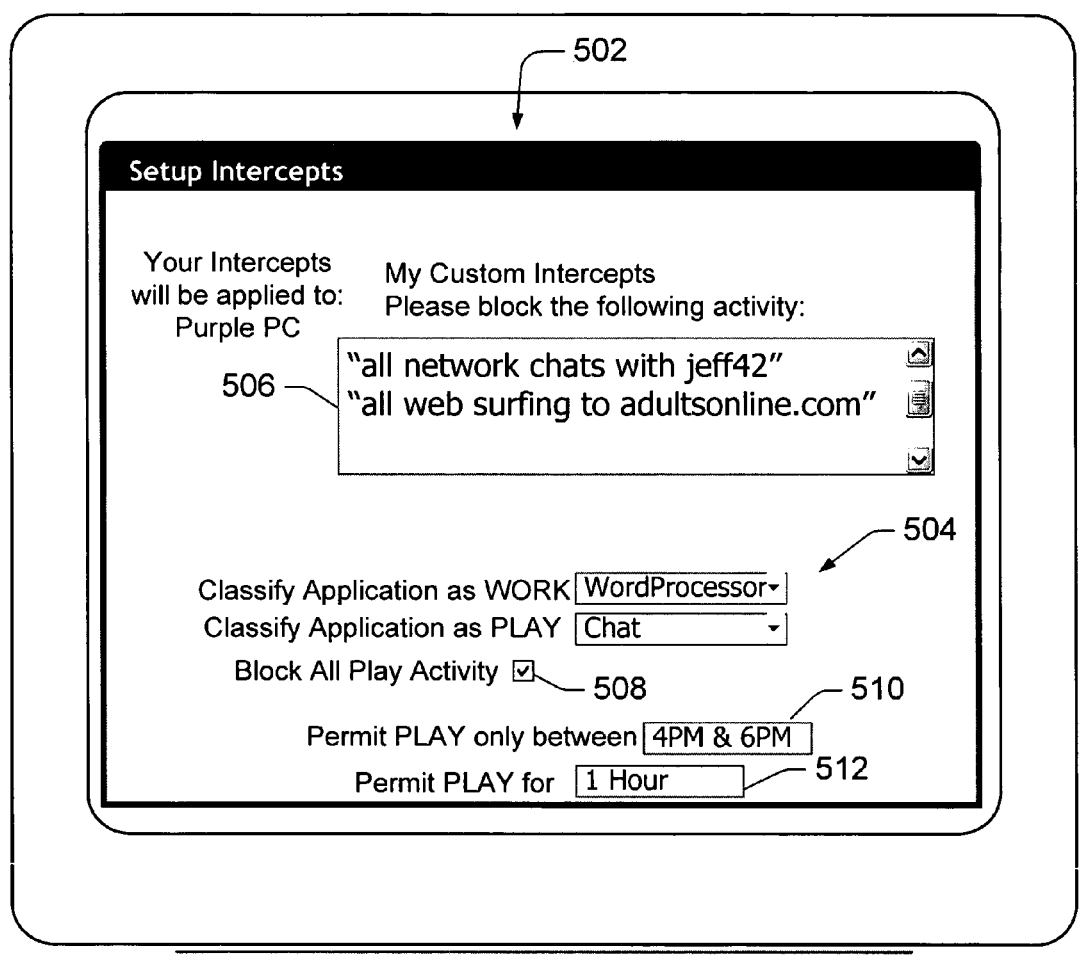
FIG. 5 illustrates an example of a user interface associated with setting-up intercepts, which is displayed for the human supervisor by the rule composer module.

FIG. 5 illustrates an example of a user interface 502 displayed for the human supervisor by rule composer module 222. Referring to FIG. 5, user interface 502 enables the human supervisor to configure and deploy rules for intercepts. The human supervisor is able to designate parameters via parameter icons 504 and parameter window 506 that are forwarded to the client device and instruct the client device to automatically restrict activity performed on the client device when it falls with certain designated parameters. For instance, the human supervisor can instruct the client device to intercept and block the initiation of certain activities to prevent them from taking place on the client device. Activities can be blocked: (i) based on the class of activity attempted, (ii) based on the duration of, or time and/or date the particular user activity that was performed, or (iii) based on a particular activity and/or keystroke.

For example by using parameter window 506, the human supervisor can request to block "all network chats with jeff42" or "block all web surfing to adultsonline.website."

Using parameter icons 504, the human supervisor may classify usage of office productivity software as WORK and everything else, such as games and web surfing as PLAY. Accordingly, by checking box 508, the human supervisor can set up a rule that blocks all PLAY activity.

It is also possible to request that specific class of activity, such as WORK or PLAY be blocked based on a schedule. For instance, using an time icon 510, it is possible to permit PLAY on the client device only between 4 pm and 6 pm.

It is also possible to request that specific class of activity be blocked based or a maximum duration. For instance using duration icon 512, it is possible for the human supervisor to restrict computer PLAY activities to one hour per day maximum.

Accordingly, using user interface 402 (FIG. 4) and 502 (FIG. 5) generated by rule composer module 222 (FIG. 2), a human supervisor may request to be notified if the user of the client device has attempted any activity that was intercepted. Typically, the act of notifying the human supervisor involves transmitting an alert message to one or more various alerting devices 108 (FIG. 1) designated by the human supervisor, such as a computer, a cell phone, a beeper, a land-line phone, a portable digital assistant, a handheld device, a television set-top box, and so forth. The alert message may be sent in various formats including, but not limited to, an electronic mail message, a text message, and/or an audio message. The alert message may also summarize the particular user activity performed by the user on the client device, and include other information, such as the duration of, or time and date the particular user activity that was performed.

For example, in one scenario the alert message may notify the human supervisor via a text message to the human supervisor's cell phone if the user of the client device has attempted to visit a prohibited website and include the link of the prohibited website.

In another scenario, the alert message may notify the human supervisor via e-mail, if the user of the client device has attempted to play computer games for more than two hours in one day and include the name of the games played.

In another scenario, the alert message may notify the human supervisor via e-mail if the user of the client device has exceeded more than one hour of activity classified as PLAY.

Any of the one or more of the icons on user interface 402 (FIG. 4) and 502 (FIG. 5) may appear on other display screens/pages presented on display device. Accordingly, some or all of the icons may be displayed in different formats, in different screens, in different order, with different verbiage, etc. and user interfaces 402 and 502 are only illustrated as one exemplary implementation.

Referring back to FIG. 2, client communication module 204 connects the supervision server 104 to the client device 102 over network 106 to transmit and receive various data required by client monitoring application 126 and supervision monitoring application 136. The client communication module 204 accepts transmission of local action data files from the client device 102 for storage on the supervision server 104. The client communication module 204 also facilitates transmission instructions and rules for intercepting activities to the client device 102, which are stored in the intercept rule list 210. This enables the client device to store the instructions and rules as indicated by client monitoring application 126.

Alerts module 206 scans client action data files 212 (to be described in more detail) on a regular basis. The scan may be configured to be performed on a schedule, such as every five minutes. Alternatively, the scan may be configured to be performed automatically for any new Client Activity Data File received by the supervision server 104. Alerts module 206 then compares the files to rules stored in the alerts rule list 208. If there is a match, an alert is triggered and transmitted to the human supervisor according to their chosen method of communication that is supported by supervision server 104, such as e-mail, or a text message sent to a mobile phone. In one implementation, each alert is also logged, in accordance with a human supervisor's preferences.

Alerts module 206, may create a connection to network 106 to transmit an alert message, or it may make the connection through an optional hardware device (not shown) to send the alert message directly to an alerting device 108 (FIG. 1), through non-networked connections, such as an interactive voice response (IVR) system which would be useful for the vision impaired or those not able to receive alerts over network, such as parents on vacation.

Alerts rule list 208 is a file that is created by the rule composer module 222, when the human supervisor connects to the network accessible front end 202, and modifies or creates rules/parameters using the rule composer module 222. Alerts rule list 208 is used by the alerts module 206 to determine if a particular user activity stored in the client action data files 212 matches a rule and alert, and if so, an alert should be sent to the human supervisor. If an alert should be sent, alerts rule list 208 also stores the preferred method of communication and contact information, e.g., e-mail address, phone number for audio message, beeper number for text message, etc.

Figure 6:
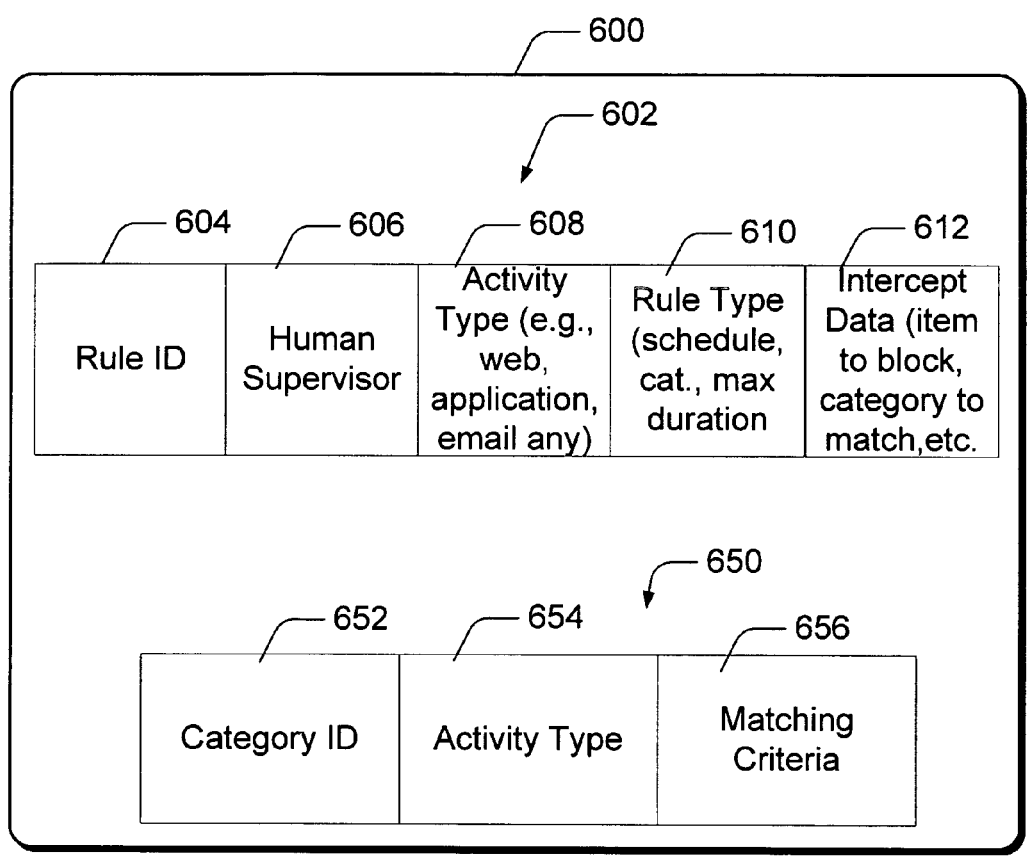
FIG. 6 illustrates an example database table structure of a rule/parameter entry stored by an alerts rule list.

In one implementation, the alerts rule list 208 stores rules received from the human supervisor as a database. For example, for each rule criteria defining the rule is entered into the database. For example, FIG. 6 illustrates an example database table structure 600 of a rule/parameter entry 602 stored by the alerts rule list 208. The entry comprises a rule ID 604, the human supervisor that requested the rule 606, the particular client device the rule applies 608, the activity type that the rule should be matched to 610, the alert type 612, and the alert data 614 that should be matched.

If there are multiple entries in the database for a particular rule ID 604, they are linked together with a logical "AND" by the alerts rule list 208. For instance, a human supervisor may set a rule ID called "Too Much Gameplaying" where the human supervisor can be notified if applications categorized as GAMES are played for more than four hours daily. With this rule, there would be entries in the data base with the following data:

Too Much Gameplaying, jsmith, purplePC, application, category, GAMES
Too Much Gameplaying, jsmith, purplePC, application, max_duration, 240.

Additionally, FIG. 6 shows an exemplary category database 650 that comprises activated categories (preexisting or configured) for use by the human supervisor to oversee a particular category of user activity. Accordingly, category database 650 does not necessarily have to be stored in the alerts rule list, but can also be stored in the intercept rule list and on the client machine (if an intercept is desired).

Category database 650 may include one or more categories types such as WORK and PLAY. For example, a human supervisor may designate all work-related activity under WORK, and everything else as PLAY. WORK activity may include the usage of office productivity software and visiting approved web sites over a network. The two categories could then be used to set rules, such as "Send me an alert if PLAY activity exceeds two hours daily" or "Block all PLAY activity over four hours daily." In one exemplary implementation, the category database 650 includes a table structure as shown with a Category ID 652, an Activity Type 654, and a Matching Criteria 656. For instance:

WORK, application, MyWordProcessor
WORK, application, MySpreadsheet
WORK, application, MyPresentationDesigner
WORK, application, MyEmailProgram
WORK, web site, CompanyLANSite
PLAY, application, CardGame
PLAY, application, Network Chat Client
PLAY, website, all other Company LANSite
PLAY, email, all from free email services.

Referring back to FIG. 2, intercept rule list module 210 is a file created by the network accessible front end 202 rule composer module 222. When a human supervisor modifies or creates rules/parameters using the rule composer module 222, these rules/parameters become a part of the intercept rule list 210. These rules/parameters are transmitted to the client device 102 via the client communication module 204. The rules are then implemented by the local action interceptor (to be described) operating on the client device 102.

Client action data files 212 are received from the client device. The client action data files 212 comprise an ongoing record of user activity performed on the client device 102. For example these data files may include chat sessions in HTML format, screen captures (screen shots), keystrokes logged, a list of recently sent e-mails, a list of recently visited web sites, a list of recently launched applications, and a list of recently created or modified files. The client action data files 212 may include other descriptive data, such as the date/time and duration of is these activities.

The client action data files are typically received from the client device 102 via the client communication module 204. Additionally, the action data files may be displayed to the human supervisor by the network accessible front end module 202. Further, as described above, the alerts module 208 scans these files on a regular basis to determine if any activity has taken place on the client device which would call for an alert message to be sent to the human supervisor.

Exemplary Client Device (Client Monitoring Application)

Figure 7:
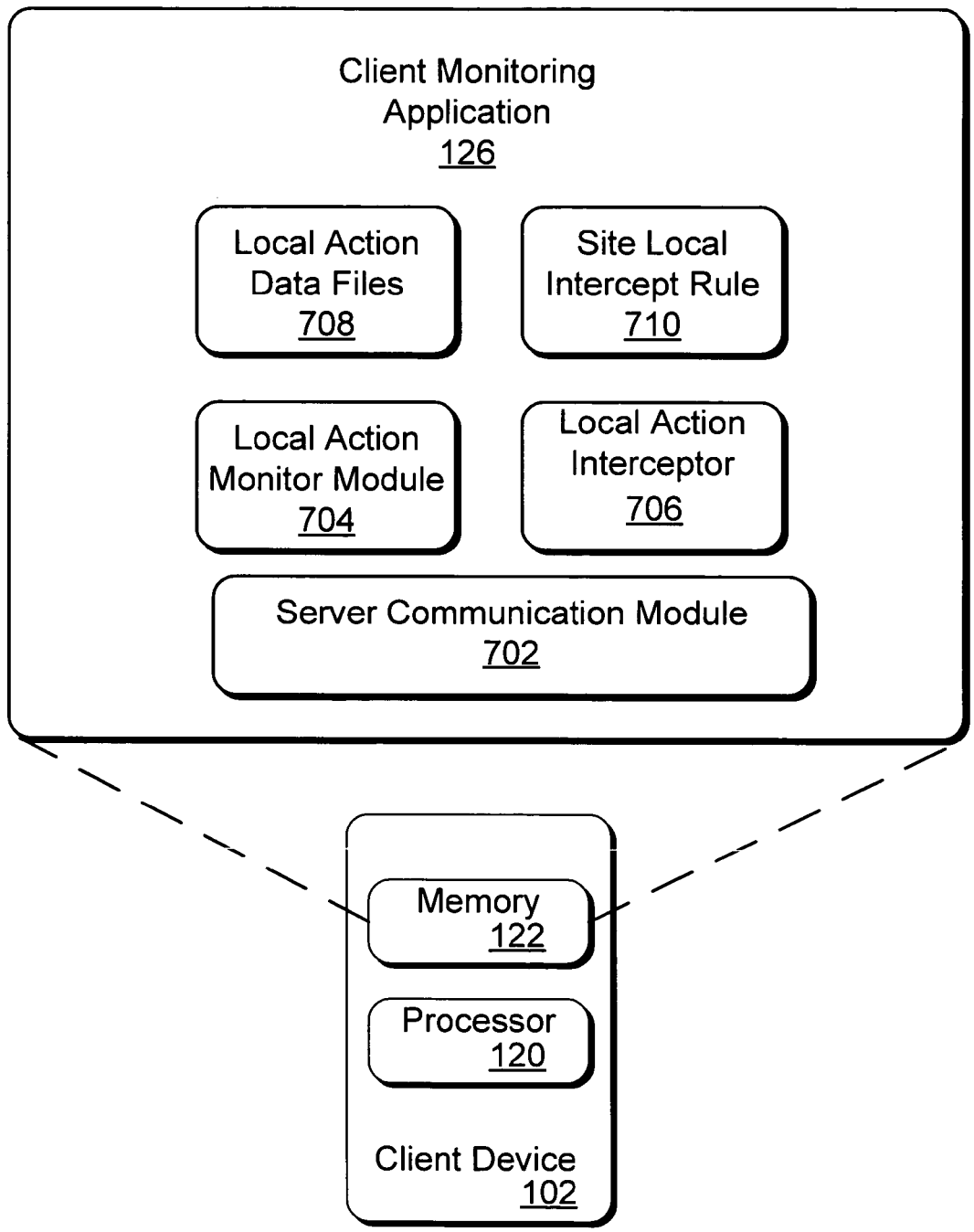
FIG. 7 is a block diagram of a client monitoring application residing in memory of a client device.

FIG. 7 is a block diagram of a client monitoring application 126 residing in memory 122 of a client device 102. The client monitoring application 126 typically operates as a background application and may operate in a stealth mode, without alerting the user. The client monitoring application forwards recorded activity (real-time activity or stored activity) to one or more supervisor servers 104 over network 106. Human supervisors are then able to login to the supervisor servers and review the activity performed on the client device.

In this example, client monitoring application 126 comprises program modules and program data. The processor 120 is configured to fetch and execute computer program instructions from the program modules in memory 122, and is further configured to fetch data from program data while executing the client monitoring application 126.

In one implementation, client monitoring application 126 comprises a server communications module 702, a local action monitor module 704, a local action interceptor 706, a local action data files 708, and a site local intercept rule list 710.

Server communications module 702 connects the client device to the supervision server so as to transmit and receive various data required by the applications. The server communications module 702 may transmit local action data files 708 (to be described) for storage on the supervision server 104. The server communications module 702 can also receive any interceptor rules/instructions from the supervision server 104.

Local action monitor module 704 records activity performed on the client device and stores the information in the local action data files 608. In one exemplary implementation, activity being recorded may include: chat session in HTML format, screen captures, keystrokes logged, a list of emails (received or sent) a list of recently visited web sites, a list of recently launched applications, and a list of recently created or modified files. The local action monitor module 704 may also record other descriptive data, such as the date/time and duration of these activities. The local action module 704 uses the server communication module 702 to transmit data/files stored in the local action data files 708.

Local action interceptor module 706 analyzes the user activity performed on the client device 102 and scans the local interceptor rule list 710 to determine if an activity performed on the client device matches an interceptor rule. If it does match an interceptor rule, local action interceptor module 706 can instruct that the particular activity being performed is intercepted prior to being fully launched, and in effect blocked from taking place on the client device 102.

Local action data files 708 are stored files recorded by the local action 11 module 704. Local action data files 708 typically comprise an ongoing record of user activity on the client device. For example, these data files may include: chat sessions in HTML format, screen captures, keystrokes logged, a list of recently sent e-mails, a list of recently visited web sites, a list of recently launched applications, and a list of recently created or modified files. The local action data files may also include other descriptive data, such as the date/time and duration of these activities.

Local intercept rule list 710 comprises a list of intercept rules/parameters specified by the human supervisor on the supervision server 104. These rules are implemented by the local action interceptor module 704. In one implementation, the list is stored as database similar to the database structures described above with reference to FIG. 6. In this instance, the client device blocks the particular kinds of activity found in the list.

Methods of Operation

Methods for supervising, monitoring and controlling user activity on a client device may be described in the general context of computer-executable instructions. Generally, computer-executable instructions include routines, programs, objects, components, data structures, etc. and the like that perform particular functions or implement particular abstract data types. The described methods may also be practiced in distributed computing environments where functions are performed by remote processing devices that are linked through a communications network. In a distributed computing environment, computer-executable instructions may be located in both local and remote computer storage 11 media, including memory storage devices (computer-readable media).

Figure 8:
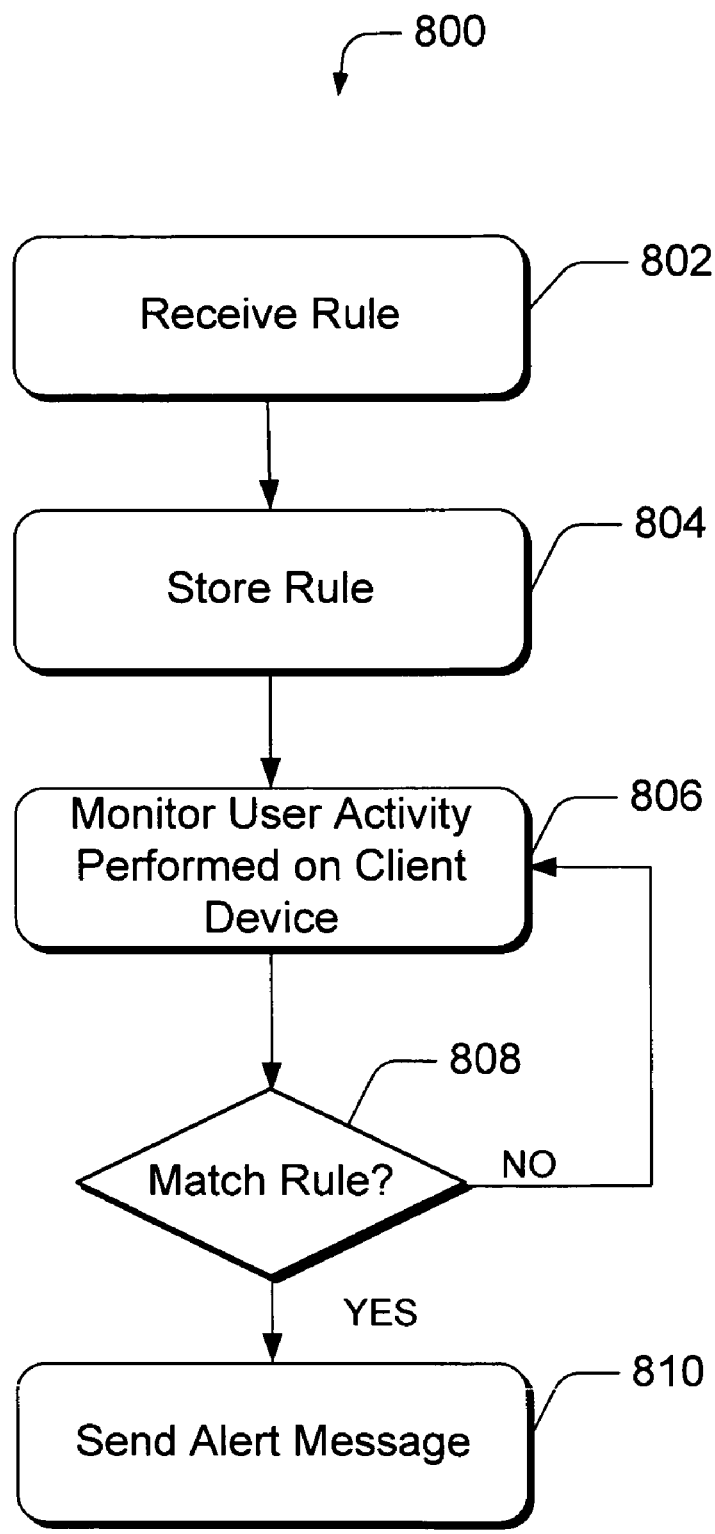
FIG. 8 is a flow diagram illustrating an exemplary method of operation associated with supervising, monitoring and controlling user activity on a client device.

FIG. 8 is a flow diagram illustrating an exemplary method 800 of operation associated with supervising, monitoring and controlling user activity on a client device 102. The order in which the method is described is not intended to be construed as a limitation, and any number of the described method blocks can be combined in any order to implement the method. Each of the operations and blocks may be optional and do not necessarily have to be implemented. Furthermore, the method can be implemented in any suitable hardware, software, firmware, or combination thereof. Exemplary method 800 includes blocks 802, 804, 806, 808, and 810.

In block 802, a rule is received. The rule defines a particular activity performed on a client device for which a human supervisor desires to be notified if a user of the client device performs the particular user activity on the client device. For example, supervision monitoring application 136 of one or more supervision servers 104 (FIG. 1) receives a rule created by a human supervisor using the network accessible front end 202 (FIG. 2). In particular the human supervisor uses rule composer module 222 to configure and deploy rules for alerts.

In block 804, the rule is stored in a database or file. For example, alerts module 206 stores the rule in the alerts rule list 208.

In a block 806, monitored user activity performed on the client device is received by the supervision server. For example, the local action module 704 (FIG. 7), monitors user activity and forwards local action data files 708 (FIG. 7) to the client communication module 204 (FIG. 2). The client communication module 204 stores the client action data files in the client action data files 212 (FIG. 2).

In a decisional block 808, a determination is made as to whether any of the monitored user activity performed on the client device matches the particular user activity defined by the rule. For example, the alerts module 206 scans the client action data files 212 to determine whether any actions recorded therein match any rules defined in the alerts rule list 208. The alerts module 206 scans the client action data files 212 for Activity, Type, Alert Type, and Alert Data that matches the any rules in the alerts rule list 208.

If there are not matches according to the NO branch of decisional block 808 the alerts module 206 continues to scan the client action data files 212. If there is a match, according the YES branch of decisional block 808, then method 800 proceeds to block 810. For example, if the alerts module 206 matches a single Rule ID from the alerts rule list 208, it may search the rule list 208 further to determine if there are other matches. Then, method 800 proceeds to block 810.

In block 810 an alert message is sent, if it is determined that the monitored user activity performed on the client device matches the particular user activity defined by the rule. For example, alerts module 206 triggers an alert message which is sent to an alerting device 108 for a human supervisor to receive via any number of different methods, including e-mail, text messaging, paging, phone call, etc. The alert message may include a description of the particular user activity performed by the user on the client device including a date and time the particular user activity was attempted, the type of activity performed, etc.

Figure 9:
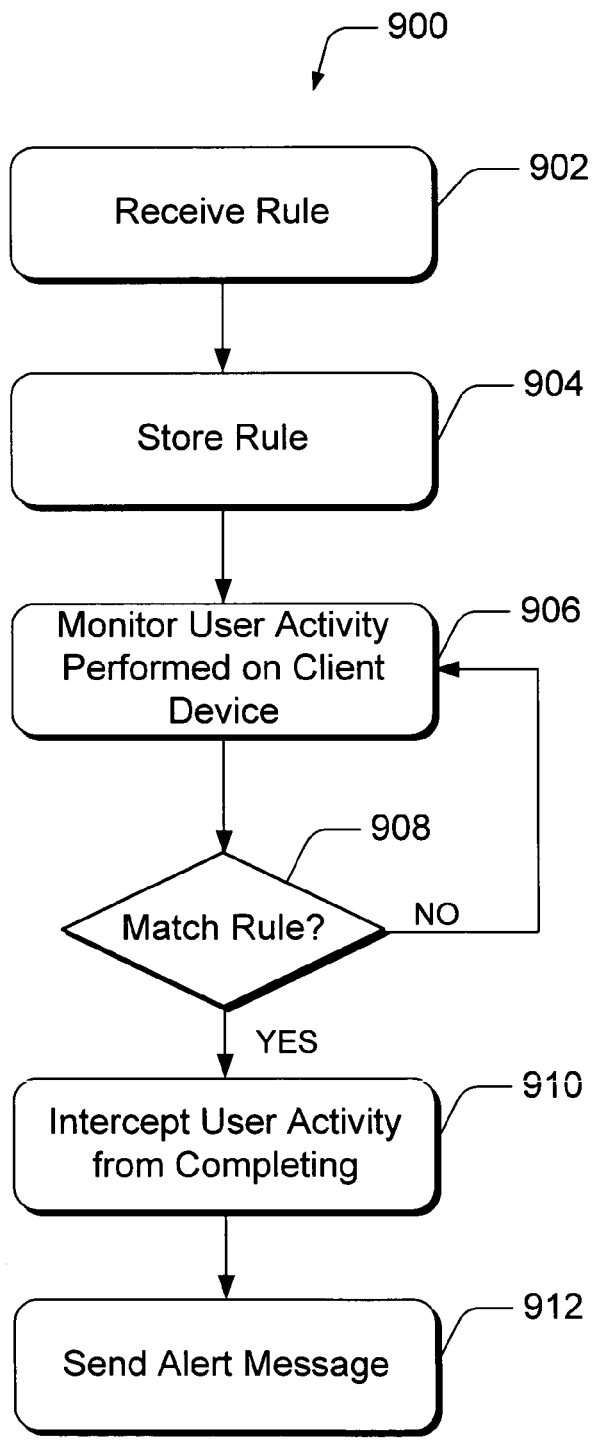
FIG. 9 is a flow diagram illustrating another exemplary method of operation associated with supervising, monitoring and controlling user activity on a client device.

FIG. 9 is a flow diagram illustrating another exemplary method 900 of operation associated with supervising, monitoring and controlling user activity on a client device 102. The order in which the method is described is not intended to be construed as a limitation, and any number of the described method blocks can be combined in any order to implement the method. Each of the operations and blocks may be optional and do not necessarily have to be implemented. Furthermore, the method can be implemented in any suitable hardware, software, firmware, or combination thereof. Exemplary method 900 includes blocks 902, 904, 906, 908, 910, and 912.

In block 902, a rule is received. The rule defines a particular activity performed on a client device for which a human supervisor desires to block from executing if a user of the client device performs the particular user activity on the client device. For example, supervision monitoring application 136 of one or more supervision servers 104 (FIG. 1) receives a rule created by a human supervisor using the network accessible front end 202 (FIG. 2). In particular the human supervisor uses rule composer module 222 to configure and deploy rules for intercepts.

In block 904, the rule is stored in a database or file. For example, the rule composer module 222 stores the intercept rule in the intercept rule list 210. This intercept rule list 210 is then forward to the client device via client communication module 204 and stored in a local interceptor rule list 710.

In a block 906, user activity is monitored on the client device. For example, a local action interceptor module 706 monitors user activity performed on the client device.

In a decisional block 908, a determination is made whether any of the monitored user activity performed on the client device matches the particular user activity defined by the rule. For example, a local action interceptor module 706, analyzes the user activity performed on the client device 102 and scans the local interceptor rule list 710 to determine if an activity performed on the client device matches an interceptor rule.

If according to the YES branch of decisional block 908, it does match an interceptor rule, the user activity attempted on the client device can be prevented from being carried out as indicated in block 910. For example, the local action interceptor module 706 can instruct that the particular activity being performed is intercepted prior to being fully launched, and in effect blocked from taking place on the client device 102.

That is, the local action interceptor module 706 analyzes the user activity to create a set of characteristics of the action for matching to the local intercept rule list 710, such as the activity type, (e-mail, or chat, for instance), and the time of day. The local action intercept module 706 iterates through each rule in the local intercept rule list 710, comparing the activity set of characteristics to the rules, each time an activity is performed by the user on the client device, such as sending an e-mail, attempting to perform an instant messaging chat with a stranger, visiting a particular web site, etc. As soon as any of the rules in the local intercept rule list 710 is matched, the action is blocked.

In block 912, if the human supervisor has configured an alert for any intercepted activity, the server communication module 702 will notify the client communications module 204 of the intercepted activity as indicated. The supervision server's alerts module 206 can then send the alert message to the human supervisor (to the alert device 108) according to configured preferences stored in the alerts rule list 208.

From the foregoing exemplary implementations, it is possible to supervise, monitor, and control real-time computer and Internet usage on any client device using the client monitoring application 126 and supervision monitoring application 136 operating on computer devices. It is possible to monitor, record, and control keystrokes, instant message chats, screen captures, launched applications, web sites visited, emails, sent and received including attachments. Supervision can include coordinating activities with parents and children, and employers/employees. It is possible to install the client monitoring application 126 (software) on a computer of a suspected terrorist/criminal, most likely without the individual's knowledge, to gain access to encrypted information.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

We claim:

1. In a client device, a method for monitoring, controlling, and supervising activities performed on a client device, the method comprising:
   monitoring user-activity performed on the client device, including viewed, sent, created, or received on the client device;
   determining whether the content includes at least one of sex drugs, violence, infidelity, hate language, and a predefined word by selecting notification activity from a menu;
   instructing the client device to intercept and block the user-activity from occurring on the client device, automatically and in real-time, if the content is determined to include at least one of sex, drugs, violence, infidelity, hate language, and predetermined word;
   determining whether the user-activity attempted on the client device matches a particular rule, wherein the rule defines at least one of the following: (i) a class of user activity performed on the client device, (ii) a time when the user activity is performed on the client device, and (iii) a duration of time a particular user activity is performed on the client device;
   instructing the client device to interpret and block initiation of the user activity from occurring on the client device, automatically and in real-time, if the user activity attempted to be performed on the client device matches the rule;
   capturing screen shots of real-time user activity performed on the computer, including those screen shots for which user-supplied content is transmitted or received in a encrypted or unencrypted format; and
   transmitting the captured screen shots.

2. The method of claim 1, further comprising sending an alert if the content is determined to include at least one of sex, drugs, violence, infidelity, hate language, and a predefined word.

3. The method of claim 1, wherein the act of monitoring the user activity performed on the client device, includes monitoring at least one of Internet activity, an electronic mail message, an instant message, a chat session, a key word, a keystroke, a screen shot, an application, a date and time a particular human activity was performed, a time an application was used by a user, and a duration of time of any user activity performed or application used.

4. The method of claim 1, wherein the act of monitoring the user activity performed on the client device is performed by a computer program module operating in a background environment of the client device.

5. The method as recited in claim 1, wherein the act of monitoring the user activity performed on the client device is performed by a computer program module operating in a background environment of the client device in a stealth mode without alerting a user of the client device.

6. The method as recited in claim 1, further comprising recording user activity performed on the client device, and sending the recorded user activity to one or more servers.

7. One or more computer-readable media having computer-readable instructions for monitoring, controlling, and supervising activities performed on a client device which, when executed by one or more processors cause the client device to:

monitor a user activity attempted on a client device;

determine if the monitored user activity attempted on the client device matches a particular user activity defined by a rule, the rule defining at least one of the following user activities: game playing, e-mailing, e-mailing to a particular address, e-mailing from a free mail site, instant messaging, instant messaging to a particular person, surfing the web, surfing particular web sites, using particular key stokes, using particular language, viewing a particular topic, viewing sexual content, using sexually explicit language, using infidelity related content, viewing hate group content, using hate related language, using violent language, viewing a terrorist organization website, using language that may be associated with a terrorist organization, using a particular chat colloquialism, attempting to perform an activity on the client device for a duration of time longer than a predetermined maximum duration, of time, attempting to visit a category of web sites on the client device, and attempting to perform the particular user activity on the client device during a certain time; and determining whether the content includes at least one of sex, drugs, violence, infidelity, hate language, and a predefined word by selecting notification activity from a menu;

intercepting and blocking the particular user activity from occurring on the client device, if it is determined that the monitored user activity attempted on the client device matches the particular user activity defined by the rule;

record screen shots of the user activity performed on the client device, including those screen shots for which user-supplied content is transmitted or received in a nencrypted or unencrypted format; and transmit the screen shots.

* * * * *

UNITED STATES PATENT AND TRADEMARK OFFICE
CERTIFICATE OF CORRECTION

PATENT NO. : 7,502,797 B2  Page 1 of 1
APPLICATION NO. : 10/966017
DATED : March 10, 2009
INVENTOR(S) : Adam Schran and Michael J. Neil It is certified that error appears in the above-identified patent and that said Letters Patent is hereby corrected as shown below:

In claim 1, at line 14, the language "including viewed, sent, created, or received," should read "including --content-- viewed, sent, created, or received".

In claim 7, column 16, at line 2, the language "maximum duration, of time," should read "maximum duration of time,".

In claim 7, column 16, lines 16 and 17, the language "a nencrypted" should read "an encrypted".

Signed and Sealed this

Twenty-first Day of April, 2009

JOHN DOLL
*Acting Director of the United States Patent and Trademark Office*